Patented Mar. 8, 1949

2,464,158

UNITED STATES PATENT OFFICE 2,464,158

ESTERS OF 1-METHYL-3-ACYLOXYPROPYL-ALPHA HALOMALONIC ACIDS AND THEIR PREPARATION

Otto Schwarzkopf, Elmhurst, Long Island, and Arnold D. Lewis, New York, N. Y., assignors, by mesne assignments, to William R. Warner & Co., Inc., New York, N. Y., a corporation of Delaware No Drawing. Application February 25, 1946, Serial No. 650,130

10 Claims. (Cl. 260—476)

This invention relates to novel esters of 1-methyl-3-acyloxypropyl-alpha halomalonic acids and to a method for preparing them.

The structural formula of these new esters may be represented as follows:

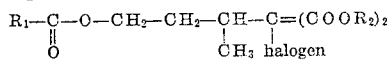

wherein $R_1$ and $R_2$ may be aliphatic or aromatic radicals, such as, for example, $CH_3$, $C_2H_5$, $C_3H_7$,

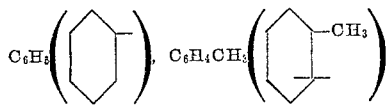

etc.; and wherein halogen represents a halogen radical, such as chlorine or bromine.

The esters of this invention may be prepared by reacting the corresponding unhalogenated compounds with suitable halogenating agents. As examples of such agents, sulfuryl chloride, bromine and N-bromo succinimide are noted.

This invention is further explained by the following examples, which are intended for purposes of illustration and not as limitations.

EXAMPLE I

*Preparation of alcohol-free diethyl sodium malonate*

15.4 grams of sodium (0.67 mol) were dissolved in 175 cc. of ethyl alcohol and 107 grams of diethyl malonate (0.67 mol) was added. After 1500 cc. of anhydrous benzene was added, the contents was distilled to remove the azeotropic mixture of ethyl alcohol and benzene. After 1000 cc. was distilled, 500 cc. of benzene was added to the distilling flask. 400 cc. more was distilled and 300 cc. of benzene was added to the distilling flask. 500 cc. more was distilled. The material distilling at this point was benzene as indicated by the refractive index, $n_D^{25}=1.4972$, and boiling point, 80° C., both being the same as the constants of the benzene used. The volume of the contents in the distilling flask was adjusted to 900 cc. by adding benzene.

EXAMPLE II

*Preparation of 3-bromobutyl-1-acetate*

To 167 grams of calcium chloride (1.5 mols) and 205 grams of 1,3-butylene glycol (2.28 mols) 336 grams of acetyl bromide (2.74 mols) were added dropwise in three hours. The contents were allowed to stand over night at room temperature (about 25° C.) and then heated for one hour to 55° C.

The reaction mass was cooled and poured on an iced saturated sodium chloride aqueous solution. The ester layer was separated and washed twice with 50 cc. of aqueous 20% sodium chloride solution, followed by a washing with 50 cc. of an iced aqueous sodium carbonate solution and 50 cc. of 20% sodium chloride until neutral. The water layer was extracted with 3×100 cc. of ether and the ether extract was combined with main ester fraction.

After drying with anhydrous sodium sulfate, the ether was distilled off and then 372 grams of substance was distilled at 70°–72° C. through a Widmer column under a pressure of 9 mm. of mercury. Redistillation of this latter material through a 25 inch Fenske column filled with glass helices of ⅛ inch diameter at a reflux ratio of 1:10 yielded 245 grams of the desired substance, 3-bromobutyl-1-acetate, in substantially pure form. This boiled at 74°–76° C. at 10 mm. of mercury pressure, and had an index of refraction $(n_D^{25})$ — of 1.4502 to 1.4516. It has a pleasant fruitlike odor.

EXAMPLE III

*Preparation of 3-Iodobutyl-1-acetate*

189 grams of 3-bromobutyl acetate (0.97 mol), heated to 32° C., was mixed with a solution of 160 grams of sodium iodide (1.07 mols) in 585 cc. of pure acetone, purified by the method of Werner (Weissberger and Proskauer, Organic Solvents, Oxford Press, 1935, page 142). At 32° C., which is the temperature at which the solubility of sodium iodide appears to be greatest, sodium bromide precipitates immediately.

The reaction mixture is allowed to stand at room temperature (about 25° C.) for four days. It is then filtered, thereby removing the salts, and washed with 50 cc. of acetone purified as above. 87 grams of salts were obtained, 84.3 grams being sodium bromide and 2.7 grams being sodium iodide.

The actone was distilled from the filtrate in vacuo (260 mm. mercury) at a bath temperature of 55° C. Ether (200 cc.) was added to the residue and the inorganic salts filtered off. The filtrate was washed with 75 cc. of sodium thiosulfate N/10 and then twice with 20% aqueous sodium chloride solution (75 cc. of the latter being used each time). Finally, the washed filtrate was dried over anhydrous sodium sulfate.

The ether was removed from the dried product, and the residue was distilled in a Fenske column at a reflux ratio of 12:1. The fraction (187.7 grams) boiling at 89.5° to 90° C. under 9 mm.

mercury pressure had an index of refraction ($n_D^{25}$) of 1.4907–1.4912. This is the desired 3-iodobutyl acetate, having a pleasant fruitlike odor.

EXAMPLE IV

Preparation of diethyl (1-methyl-3-acetoxypropyl)-malonate 148 grams of 3-iodobutyl-1-acetate (0.61 mol) as prepared according to the above and having a boiling point of 90° C. at 9 mm. of mercury pressure, $n_D^{25}=1.4910$, was added to the 900 cc. of benzene suspension of sodium diethyl malonate prepared according to the above procedure. The reaction was allowed to proceed under reflux conditions, the bath temperature being 105° C. The reaction was followed by determining the quantity of sodium iodide formed. At the end of seven hours of reaction time, an analyzed sample showed the reaction was 93% complete. The solution was acidified with 50 cc. N/1 sulfuric acid and 600 cc. of water. The benzene layer was separated and washed twice with 150 cc. of water. The water layer was washed five times with benzene. The benzene layers were combined and dried over anhydrous sodium sulfate.

The solvent was distilled from the benzene solution. The residue was then distilled in a Widmer column, 104 grams of a fraction having an index of refraction, $n_D^{25}=1.4313-1.4322$, boiling point 122°–123.5° C. at 1.2 mm. of mercury pressure was obtained. Redistillation gave 83.8 grams of a substantially pure product, $n_D^{25}=1.4318$, $d^{25}=1.064$, $M_D=66.8$, theory=67.2, yield=50%.

EXAMPLE V

Preparation of diethyl 1-methyl-3-acetoxypropyl-alpha chloromalonate

To 21.9 grams (0.08 mol) of diethyl-(1-methyl-3-acetoxypropyl)-malonate, prepared in accordance with the above, was added 13 grams (0.08 mol) of sulfuryl chloride over a period of 7 minutes. The solution was kept for three hours at 35°–45° C. Then 50 cc. of ether was added, and the whole refluxed for one hour. The reaction mass was allowed to stand over night at room temperature (about 25° C.). The ether and excess of sulfuryl chloride was then evaporated in vacuo by heating to 35° C. under 260 mm. of mercury pressure, and the residue was transferred to a separatory funnel and 200 cc. added to it. The ether solution of the residue was washed with 20 cc. of cold water (10° C.), then twice with saturated aqueous sodium bicarbonate solution, each time 20 cc. of bicarbonate solution being used, and finally, twice with cold water (10° C.), each cold water wash being made with 20 cc. of water. The washed material was dried over anhydrous sodium sulfate.

The ether was removed by distillation and the residue distilled through a Widmer column. 22.5 grams of the desired substance was obtained. It had a boiling point of 109° C. under four microns of mercury pressure, $n_D^{25}=1.4432-1.4436$, $d_{25}=1.137$, $M_D=72.01$.

EXAMPLE VI

Preparation of diethyl-(1-methyl-3-acetoxypropyl)-alpha bromomalonate 26.8 grams (0.098 mol) of diethyl-(1-methyl-3-acetoxypropyl)-malonate, prepared according to the foregoing procedure, was dissolved in 35 cc. of carbon tetrachloride and there was added 17.2 grams (5.5 cc., 0.108 mol) of dry bromine, dried by shaking with concentrated sulfuric acid. The bromine was added slowly at room temperature at the beginning until the reaction started. It took 30 minutes to get the reaction started. Then an ice bath was placed under the reaction flask and the bromine added slowly during 2 hours. After that the reaction mixture was stirred for another 30 minutes, then 100 cc. of a 5% sodium carbonate solution were added slowly under stirring with the ice bath surrounding the reaction vessel. The carbon tetrachloride solution was diluted with 35 cc. more of carbon tetrachloride and was separated from the water layer. It was washed with 6×25 cc. of 5% sodium carbonate and 1×30 cc. of water. The carbonate and water washings were added to the original water layer and extracted with 2×50 cc. of ether. The ethereal extract was washed with 2×20 cc. of 5% sodium carbonate and then washed with 20 cc. of water. The ether and carbon tetrachloride extracts were then mixed and dried overnight over anhydrous sodium sulfate.

On distillation there was obtained, after the solvent was distilled off:

| | | |
|---|---|---|
| 2.3 grams | 131–137° C./1 mm. | $n_D^{25}=1.4522$ |
| 8.7 grams | 137–139° C./1 mm. | $n_D^{25}=1.4545$ |
| 20.0 grams | 138–139° C./1 mm. | $n_D^{25}=1.4557$ |

The last fraction is the desired material.

EXAMPLE VII

Preparation of diethyl-(1-methyl-3-benzyloxy propyl)-malonate 172 grams (0.67 mol) of 1-benzoyloxy-3-bromobutane was added to a solution of 300 grams (2 mols) of dry sodium iodide in 1000 cc. of dry acetone. The formation of a precipitate of sodium bromide set in immediately.

After a few days' standing at room temperature, the precipitate was filtered off and washed with acetone. The precipitate weighed 69 grams (100% yield). The acetone was distilled off from the filtrate and the residue was extracted with ether. The dark brown ether solution was washed with a sodium thiosulfate solution, with water, with a sodium bicarbonate solution and again with water. The resulting colorless ether extract was dried over sodium sulfate and distilled. The main fraction (191 grams) distilled between 108° and 121° C./0.20–0.25 mm. This fraction was dark brown. It was taken up with some low boiling petroleum ether and this solution was decolorized by shaking it with a small amount of mercury. After filtration and evaporation of the solvent, the residue was redistilled. A fraction (170 grams) boiling at 119°–123° C. under 0.25 to 0.30 mm. mercury pressure and having an index of refraction ($n_D^{25}$) of 1.556 to 1.559 was obtained. This is 3-iodobutyl-1-benzoate.

Employing this 3-iodobutyl-1-benzoate in place of 3-iodobutyl-1-acetate, and following the procedure of the preceding example, diethyl-(1-methyl-3-benzoyloxy propyl) malonate is obtained. It distills under high vacuum (4×7×10⁻⁴ mm. of mercury) at 90°–100° C., and has an index of refraction, $n_D^{25}=1.49$.

EXAMPLE VIII

Preparation of diethyl (1-methyl-3-benzoyloxy propyl)-alpha chloromalonate

In accordance with the procedure given above for the preparation of diethyl-(1-methyl-3-acetoxy-propyl)-alpha chloromalonate, except that diethyl-(1-methyl-3-benzoyloxy propyl)-malonate is used here in place of the corresponding acetoxy compound, diethyl-(1-methyl-3-benzoyloxypropyl)-alpha chloromalonate, which distills at 94°–98° C. under $10^{-3}$ mm. of mercury and has an index of refraction, $n_D^{25}=1.48$, was obtained.

EXAMPLE IX

*Preparation of diethyl-(1-methyl-3-benzoyloxypropyl)-alpha bromomalonate*

In accordance with the foregoing procedure given for the preparation of diethyl-(1-methyl-3-acetoxypropyl)-alpha bromomalonate, but here using diethyl-(1-methyl-3-benzoyloxy propyl)-malonate in place of the corresponding acetoxy compound, diethyl-(1-methyl-3-benzoyloxy propyl)-alpha bromomalonate, which distills at 84°–103° C. under $3\times10^{-4}$ mm. of mercury and has an index of refraction, $n_D^{25}=1.50$, was obtained.

The novel esters of 1-methyl-3-acyloxypropyl-alpha halomalonic acids, prepared in accordance with the procedure described above, are useful as intermediates in the preparation of numerous organic compounds. For example, they can be used in the synthesis of vitamin A and barbiturates.

We claim:

1. The compound having the structural formula:

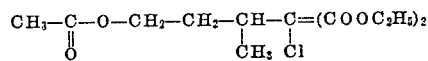

2. The compound having the structural formula:

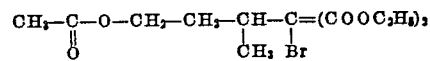

3. The compound having the structural formula:

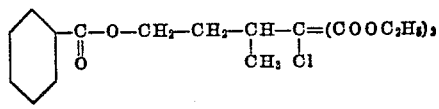

4. The process for making the compound of claim 1, comprising reacting the corresponding non-chlorinated compound with sulfuryl chloride.

5. The process for making the compound of claim 2, comprising reacting the corresponding non-brominated compound with bromine.

6. The process for making the compound of claim 3, comprising reacting the corresponding non-chlorinated compound with sulfuryl chloride.

7. Compounds having the structural formula:

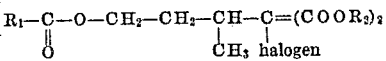

wherein $R_1$ and $R_2$ are a member selected from the group consisting of the methyl, ethyl, propyl, phenyl and tolyl radicals.

8. The compounds of claim 7 wherein the halogen atom is chlorine.

9. The compounds of claim 7 wherein the halogen atom is bromine.

10. The process for making compounds having the structural formula:

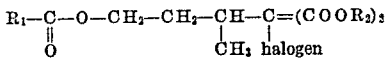

wherein $R_1$ and $R_2$ are members selected from the group consisting of the methyl, ethyl, propyl, phenyl and tolyl radicals which comprises reacting the corresponding unhalogenated compounds with a member selected from the group consisting of sulfuryl chloride, bromine, and N-bromosuccinimide.

OTTO SCHWARZKOPF.
ARNOLD D. LEWIS.

REFERENCES CITED

The following references are of record in the file of this patent:

Dox et al., J. Am. Chem. Soc., vol. 46 (1924), pages 1278–1281.
Michael, J. Am. Chem. Soc., vol. 58 (1936), pages 999–1004.
Hirst et al., J. Chem. Soc., vol. 121, page 2178.